US006845130B1

(12) United States Patent
Han et al.

(10) Patent No.: US 6,845,130 B1
(45) Date of Patent: Jan. 18, 2005

(54) MOTION ESTIMATION AND COMPENSATION FOR VIDEO COMPRESSION

(75) Inventors: Soo-Chul Han, Scotch Plains, NJ (US); Christine Podilchuk, Bridgewater, NJ (US)

(73) Assignee: Lucent Technologies Inc., Murray HIll, NJ (US)

( * ) Notice: Subject to any disclaimer, the term of this patent is extended or adjusted under 35 U.S.C. 154(b) by 485 days.

(21) Appl. No.: 09/689,229

(22) Filed: Oct. 12, 2000

(51) Int. Cl.⁷ .............................................. H04N 7/18
(52) U.S. Cl. ............................ 375/240.16; 375/240.17
(58) Field of Search .......................... 375/240.1–240.17

(56) References Cited

U.S. PATENT DOCUMENTS 6,345,126 B1 * 2/2002 Vishwanath et al. ........ 382/253
6,370,196 B1 * 4/2002 Griessl et al. ......... 375/240.16
6,466,623 B1 * 10/2002 Youn et al. ............. 375/240.16
6,560,371 B1 * 5/2003 Song et al. .................. 382/240

* cited by examiner

*Primary Examiner*—Andy Rao

(57) ABSTRACT

An encoding method for reducing motion video data sizes using a multitude of variable-sized data blocks that are derived from spatial translation vectors and the motion field of an image. Using variable-block sizes to characterize the groups of picture elements (pixels) in an image frame allows for the inter-mixing of coarse (for static areas) and fine (for areas of complex motion) resolution data descriptions in the same descriptive data block.

A comparison of motion event areas is made between successive video frames, and a motion displacement vector is calculated for each pixel location in the frame. A data tree is constructed from these pixel motion vectors and is pruned to eliminate static areas. The remaining leaves of the pruned tree are encoded differentially and applied to a lossless arithmetic encoder to provide a significantly reduced data block that still retains the highest resolution of the image.

16 Claims, 5 Drawing Sheets

MOTION ESTIMATION AND COMPENSATION FOR VIDEO COMPRESSION

FIELD OF THE INVENTION

This invention relates to the field of video data encoding, and more particularly to a method for the encoding a variable-motion video data signal.

BACKGROUND OF THE INVENTION

In conventional serial transmission of digitized real-time video data signals, a typical communications channel has insufficient capacity to carry the large amount of data needed to accurately represent a moving video picture. For example, in a typical video system operating at 30 frames per second, where each frame has a resolution of 720×480 picture elements (pixels) with each pixel requiring 8 descriptive data bits, a transmission channel having a capacity of 83 M bits per second would be required. Such high data rates far exceed the practical transmission systems in use today.

Thus, various data reduction techniques are typically employed to reduce a real-time data transmission to more a manageable size. Such techniques typically reduce or inhibit the transmission of pixel data that is unchanged from a predecessor frame. While this works well for predominately static images, images that contain complex motion require a more sophisticated mathematical modeling of the video motion.

Typically, such modeling features a comparison and analysis of groups of pixels to detect changes that occur between successive video frames. Once such motion is identified, x-y directional translation vectors can be determined that are used for a predictive estimation of a motion field. To reduce the resulting vector data to conform to the communication channel, however, requires that the size of the pixel group be rather large, such as that of conventional widely used video encoding standards, which compare an 8×8 or a 16×16 pixel area or block. As can be seen, such "block-based" motion encoding significantly lowers the amount of data to be transmitted.

However, a significant drawback of such systems is any motion is assumed to be constant over the entire block. Thus, this relatively large size of the fixed comparison block leads to an objectionable visual distortion in the received picture when motion fields are rapid. This is perceived as a tiling effect and effectively reduces image resolution via the associated 8- or 16-bit motion step.

A further drawback is that any changes at individual pixels sites are effectively averaged with the entire block, and any complex motion that is contained within a pixel area smaller than the selected comparison block size is generally not detected. Such small motion is therefore not included in the transmission, nor the subsequent display of the image at the receiving entity, giving attendant degradation in viewing resolution.

SUMMARY

A method for optimizing the encoding for transmission of motion video images uses a multitude of variable-sized data blocks that are derived from spatial translation vectors and are based on an analysis of the motion field of an image. Using the variable-block sizes to characterize the groups of picture elements (pixels) in an image frame allows for the inter-mixing of coarse (for static areas) and fine (for areas of complex motion) resolution data descriptions in the same descriptive data block.

A multi-scale motion field is calculated for each video frame based on the previously encoded video frames. At the finest level of the multi-scale motion field, a motion vector is calculated for each pixel location. At each coarser scale, the motion field resolution decreases by two in the horizontal and vertical direction. In other words, a motion vector represents a 1×1 pixel area at the finest scale, a 2×2 pixel area at the second scale, a 4×4 pixel area at the third scale, an 8×8 pixel area at the fourth scale, and continuing until the coarsest scale (typically 16×16). This multi-scale motion data is represented as a "tree" with four branches added to each branch as you descend the tree to the next finer scale. This tree is pruned back to eliminate fine scale motion data in static areas where to motion data is fairly constant and smooth, keeping the lower branches only in areas of complex motion. The remaining branches of the tree are differentially encoded to compress the resulting multi-scale motion data. This data is losslessly encoded using an entropy coder, such as an arithmetic or Huffman coder.

The resulting data and the details of the structure of the pruned tree are retained together for image reconstruction at a receiving display station. Thus, the pruned tree allows for coarse motion representation (fewer bits) to represent the static areas or areas with low motion activity and detailed motion representation (more bits) to represent complex motion activity. Application of a distortion parameter during pruning allows for the reduction in the image resolution of a motion field without exhibiting mosaic tiling effects of moving a group of pixels at a low image.

DETAILED DESCRIPTION OF THE INVENTION

According to a preferred embodiment of the present invention, a method is disclosed for using variable-block sizes as a mask for a group of picture elements (pixels) for detecting and processing video movement, rather than the fixed-block size of conventional approaches. A video block that has no motion from a previous frame can be transmitted as a larger block than a video block that has pixel motion. A differentiation algorithm derives the largest sized data elements that can still retain the resolution of a motion event. The variable-sized elements are then stored or transmitted sequentially.

To allowing for the intermixing of such variable-sized elements, each element is preceded by a short data header, which signifies the resolution of the trailing data element. The procedure for deriving these data elements involves creating a data tree from the pixel information at the densest resolution of the video display. The data tree is then pruned to obtain the smallest data size that, when reconstructed, will successively retain the desired resolution of a motion event. The pruned data is then concatenated with the header. When each data element is decoded at a displaying destination, the header is examined to determine the video reconstruction method to use.

Figure 1:
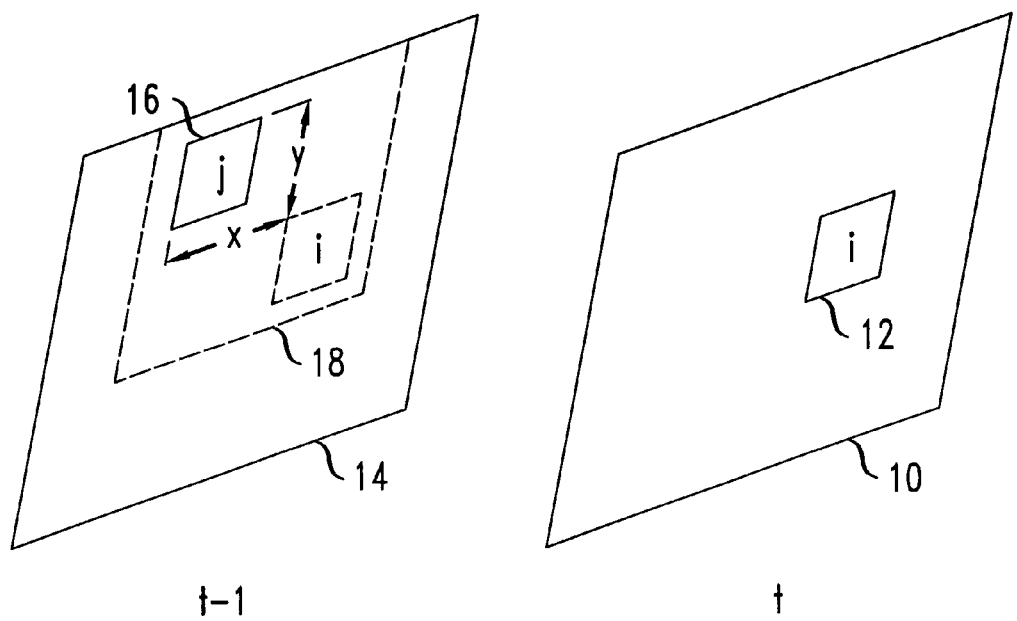
FIG. 1 shows a partitioning of a video frame to derive the data elements according to the present invention.

FIG. 1 shows a partitioning of a video frame to derive the motion data elements according to the present invention. In a frame of a video image 10 that has a previously identified distinctive motion field 12 present in a portion of the frame, which occurs at a time t, a selective search and comparison can be made with an immediately predecessor video frame 14, which occurs at time t-1, to find a "best-matching" block of pixels 16. An area 18 is searched to find the matching motion fields 12 and 16 and determine an x and y displacement of the fields that occurred between the two frames. For each pixel located in motion field 16, a unique x-y displacement is obtained to create a distinct motion vector for that pixel location.

The motion field is represented at multiple scales in a coarse-to-fine manner, where the motion at the coarse level represents the average motion of the corresponding pixels at the finer level. The finest scale represents the dense (one motion vector at each pixel) level. For example, consider the motion field as consisting of a pyramid of data, where the top of the pyramid represents coarse scale motion data and the base of the pyramid represents the finest scale. If the finest scale consists of an exemplary 16×16 block of pixels, each block at the bottom of the pyramid contains 1 motion vector per pixel, while the one block at the top of the pyramid contains 1 motion vector (average value) for the entire 16×16 pixel block. Between the two exist various intermediate levels, with each intermediate level having half the resolution of the level below it in the pyramid.

Figure 2:
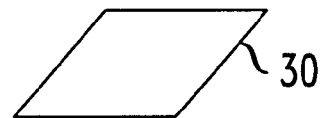
FIG. 2 shows an exemplary pyramid having a 16×16 base.
Figure 2:
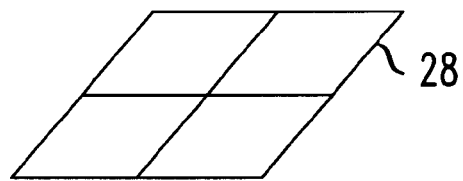
Figure 2:
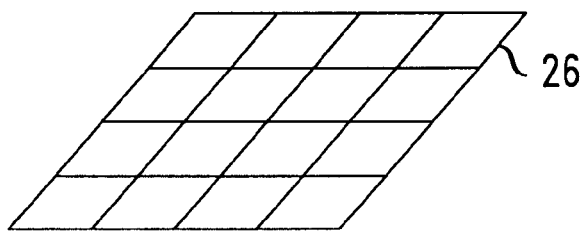
Figure 2:
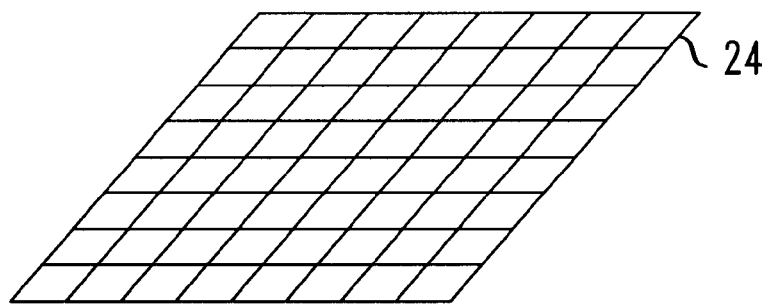
Figure 2:
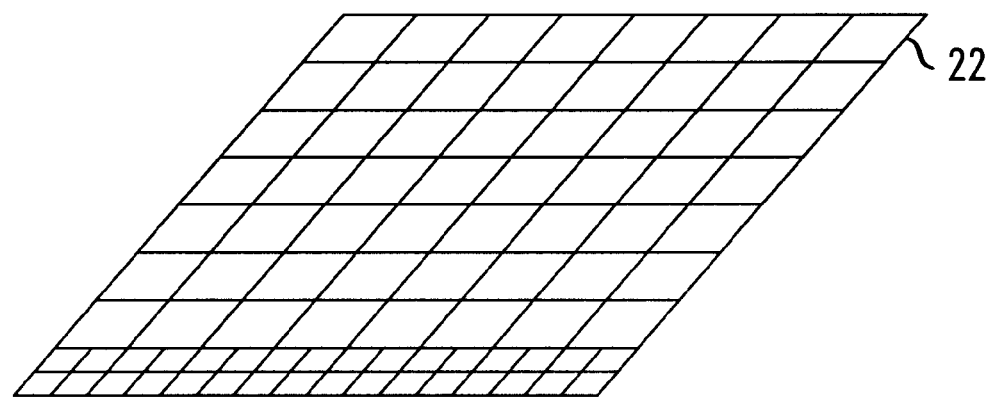

FIG. 2 shows an exemplary pyramid 20 having a 16×16 base. The pyramid has a 16×16 grid resolution at the bottom, or first level 22 denoted as level 0. This is followed successively by an intermediate level having an 8×8 grid at a second level 24 denoted as level 1, a 4×4 grid at a third level 26 denoted as level 2, a 2×2 grid at fourth level 28 denoted as level 3, and a single grid at the top, or fifth level 30, denoted as level 4. Ascending the pyramid, each block represents the average motion of the four blocks immediately beneath it.

Figure 3:
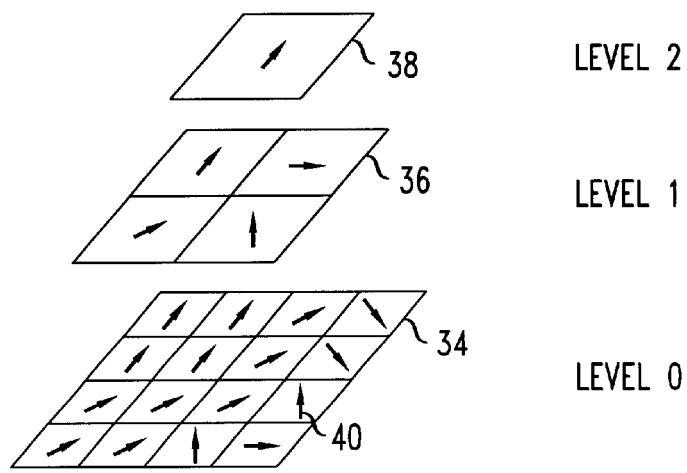
FIG. 3 shows an exemplary tree.

To simplify the explanation of the derivation of the data elements, FIG. 3 shows an exemplary pyramid or tree 32, having levels 0 through 2, labeled as 34, 35, and 36, respectively, and representing the possible motion vectors 38 of a 4×4 block of video pixels. Such motion vectors 38 can be derived using an exemplary Markov random field (MRF) formulation on a four dimensional lattice (spatio-temporal+scale) with local (four dimensional) smoothness constraints. See S. Servetto and C. Podilchuck; "Stochastic modeling and entropy constrained estimation of motion from image sequences," in Proceedings of IEEE International Conference, Image Processing, Vol. 3, pp 594–595, Chicago, 1998.

The coding of the x (horizontal) and y (vertical) component of each motion vector 38 is performed separately.

The derivation of the motion vectors results in the pyramid or tree structure 32, where each node of the tree represents a point on the multi-scale grid. Each node is initially populated with a data rate value and a distortion value. The data rate value is estimated using a zero-order entropy, and the distortion value represents a motion-compensated prediction error when using the vector associated with that node.

Tree 32 is then pruned using an algorithm that can incorporate the 25 tradeoff between data rate and the resulting image distortion. According to the present invention, since the video motion can be represented as a tree, a generalized tree-pruning algorithm, such as that disclosed by Breidman-Friedman-Olshen-Stone (BFOS), can be used. See S. Han and C. Podilchuck, "Efficient encoding for dense motion fields for motion-compensated video compression", Proceedings of IEEE International Conference on Image Processing, Kobe, Japan, October 1999.

Figure 4:
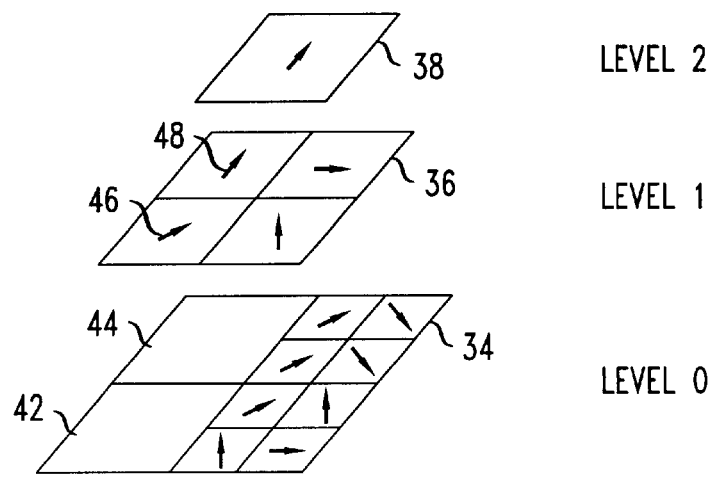
FIG. 4 shows the tree shown in FIG. 3 after a pruning operation.

FIG. 4 shows tree 32 after the pruning operation. The static areas 42 and 44 are pruned, and the values 46 and 48, respectively, in the next higher level 35 are used to represent the motion vectors in that portion of level 0, labeled as 34. Once the pruned motion field has been found, the motion vector components are differentially encoded. Since the map information is retained with the data, only the motion vectors associated with leaf nodes of the pruned tree need to be encoded. The leaf nodes of the pruned tree are scanned in a "U-shaped" scan order.

In addition to the data elements of the pruned tree, the pruning information is coded and is retained as part of a general compression overhead using a quad-tree amp. The pruned x and y motion fields are then encoded losslessly using adaptive arithmetic coding (a type of entropy encoder).

To better explain the pruning operation and the use of the resultant pruned tree, several simplified examples will be examined. For the following discussion, the context of the term "data word" will mean a data size that is appropriate to describe the information in the pixels. This can be bytes, words, double-words, etc, and is dependent on the desired resolution of the reconstructed image.

For an example of the characterization of an image, consider a representative frame having 720×480 picture elements, which consists of a 45×30 matrix of discrete 16×16 pixel areas. To describe the frame using the 16×16 areas at the coarsest resolution would require 1350 data words, and to describe the frame using individual pixels at the highest resolution would require 345,600 data words. If motion is present in an exemplary 50 of the 1350 16×16 areas, each of the static areas can be described by a single data word, or a total of 1300 data words. If the 50 motion areas were described at the highest resolution of 256 per 16×16 area, an additional 12,800 data words would be needed. The total of 14,100 data words describing the frame would provide 100% of the highest resolution motion, but represent a 96% reduction in the number of data words needed to describe the image over that of the 345,600 data words at the highest resolution description.

While this represents a significant improved, it still would be insufficient for many applications. Accordingly, the present invention provides a further refinement in the pixel processing using sophisticated tools commonly used on data trees and their reductions, or pruning, using algorithms. Employment of such tools provides additional reductions in the-number of data words required to describe the image frame.

Figure 5:
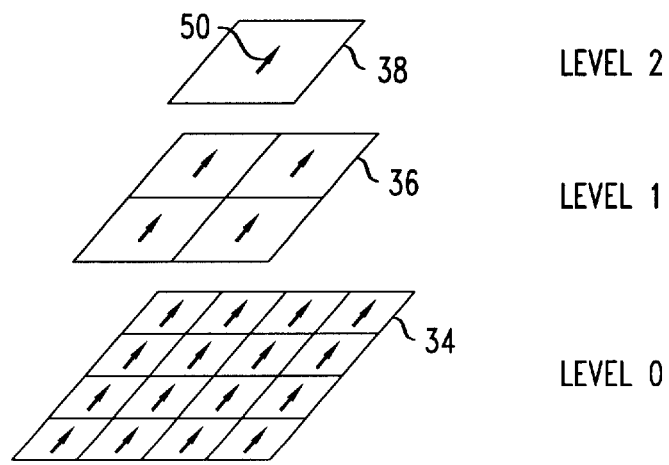
FIG. 5 shows a 4×4 pixel area having 16 unchanged motion vectors.
Figure 6:
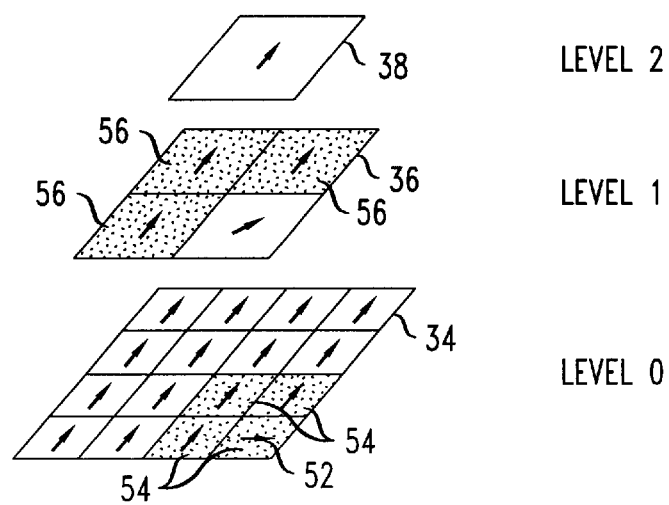
FIG. 6 shows a 4×4 pixel area having a single motion event.

The 4×4 area of FIG. 5 shows sixteen unchanged motion vectors at level 0, or label 34. The differential encoder would indicate no changes and only a single data word would be required describe the 4×4 area, that of level 2 vector 50. If however; a 2×2 quadrant in the lower right corner shows a single changed vector 52 as shown in FIG. 6, four data words characterizing that 2×2 quadrant at level 0, as indicated by the four shaded areas 54, would define the vectors in that area and each would have a header indicating level 0. Each of the remaining quadrants of the 4×4 matrix, as indicated by the remaining un-shaded area on level 0, would be defined by a single data word describing each quadrant at the next higher level, or level 1, as indicated by the three shaded areas 56. The vectors in areas 56 would have a header indicating level 1. Thus, rather than employing 16 data words to describe the 4×4 matrix at the highest resolution, only seven-data words are required, for a reduction of-over 50% over that of the highest resolution description.

Figure 7:
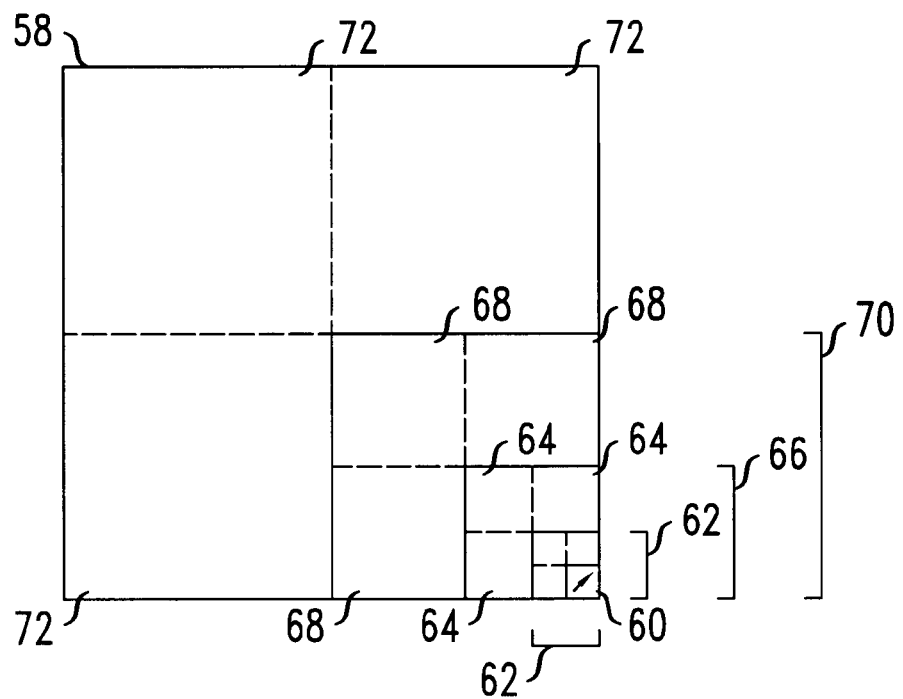
FIG. 7 shows a top view of a 16×16 pyramid having a single motion event.

Expanding this process to a 16×16 area, FIG. 7 shows a top view of a 16×16 pyramid 58 having a single motion event 60. The data description features four data words from level 0 for the 2×2 area 62 having motion event 60, with the remaining three 2×2 quadrants 64 of that 4×4 area 66 having three data words from level 1 as discussed above. The other three 4×4 areas 68 of that 8×8 quadrant 70 that are unchanged are also each characterized by a single data word-obtained at the next higher level, level 2. The other three 8×8 quadrants 72 at the next higher level of the 16×16× matrix, level 3, that are unchanged also are each be characterized by a single data word. The resulting data description of the motion vectors in the total 16×16 area is thus the four data words of the motion area 62 at level 0 and three data words at each of the remaining quadrants at levels 1, 2, and 3, labels 64, 68, and 72, respectively, for a total of 13 data words vs. the 256 data words that would be required to describe every pixel in the 16×16 area. This represents approximately a 95% reduction in the data required to describe the image area, but still retaining all of the highest resolution motion in that image. Applying this reduction to the fifty 16×16 motion areas discussed in the first example, reduces the number of data words an additional two orders of magnitude-for a total of 1300 plus 650, or 1950 data words. This is a minor increase over the coarsest resolution of the 16×16 blocks, especially when compared with the 345,600 data words required to describe the image frame at 100% of the highest resolution.

Although, the foregoing discussion involved 100% retention of the image motion, in practice, a much lower resolution can be satisfactorily used. Using a higher distortion parameter in the BFOS algorithm to allow for a level 2 resolution, for example, will reduce the data describing the 2×2 area to a single data word, which when added to the three data words for the remaining quadrants yields a total image description of six data words for the 16×16 area vs. the 256 data words that would be required at the highest resolution. Applied to the preceding example, this would reduce the total number of data words to 1300 plus 300, or 1600 data words for the slightly reduced resolution.

While the foregoing discussion used a single pixel motion for purposes of simplifying the explanation of the process, in reality, an image will include several pixels in "motion" and can include several 16×16 areas. However, the exemplary data word reductions provided by the present invention will still be valid. The selection of the 16×16 area for processing is also exemplary. Many sizes can be chosen for such a matrix, from the single pixel up to the full image size. The 16×16 merely area represents the conventional implementation of motion image processing and is used for comparison purposes to show the significant advantages of the present invention.

In summary, the method for reducing the data content of an image consists of the steps:

1) comparing two successive frames of a video image;

2) identifying motion events and a displacement between the two;

3) creating a vector for each pixel location within the motion region;

4) creating a data tree from the derived motion vectors using the Markov random field (MRF) formulation;

5) pruning the resulting data tree using the BFOS algorithm;

6) differentially encoding the leaves of the pruned tree;

7) performing a "U-shaped" scan of the leaves of the pruned tree to obtain a resultant data block; and 8) encoding the data block losslessly using an adaptive arithmetic coding algorithm.

Applying differential encoding that compares previous motion vectors to the individual motion vectors is preferably performed after the pruning operation on the tree to reduce the number of operations, but it can successfully be performed anywhere earlier in the procedure with identical results. Also, due to differential encoding of the pixel information, an initial 100% screen must be recorded as an initial reference for applying the differential changes during reconstruction of the image. Note that using an alternative differential encoding technique that compares successive current leaf motion vectors with each other during the sequential "U-shaped" scanning that occurs after pruning, the requirement for retention of the initial image can be eliminated. To avoid data errors in a transmission of such differential data, the reduced data must be protected using a sophisticated forward-error-correction scheme, such as that promulgated by Reed-Solomon, to preserve data integrity and to prevent total destruction of an image during the reconstruction. Such network and transmission details are beyond the scope of this invention.

It is apparent from the foregoing that significant efficiencies can be made in the data block sizes that characterize motion video frames by intermixing different resolution data blocks in a same data stream. The size of such data blocks is dependent only of the density of the motion within associated pixel areas. The coarsest resolution, with attendant small data sizes can be used for those areas that have static fields, while the finest resolution can be used for the dense-motion areas. Further, according to the present invention, selectable distortion parameters allow the size of transmitted data blocks to be optimized by incrementally lowering the resolution of the image, while still displaying a decoded image that has higher resolution that that of conventional approaches.

Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention. Details of the methods may be varied without departing from the spirit of the invention, and the exclusive use of all modifications which come within the scope of the appended claims is reserved.

What is claimed is:

1. A method for encoding motion video information, comprising the steps of:

a) deriving a plurality of image motion vectors using a derivation algorithm;

b) creating a data tree comprised of said motion vectors using a construction algorithm, each node of said tree comprising a unique motion vector;

c) reducing said tree using a pruning algorithm;

d) encoding leaves of said reduced tree using a differentiation algorithm; and e) creating a plurality of descriptive data elements, each data element further comprising:

a header portion; and a data portion.

2. The method according to claim 1, wherein the construction algorithm is a Markov random field (MRF) formulation using selected parameters.

3. The method according to claim 2, wherein the selected parameters comprise a four-dimensional lattice (spatio-temporal+scale) with local four-dimensional smoothness constraints.

4. The method according to claim 1, wherein the pruning algorithm is a Breidman-Friedman-Olshen-Stone (BFOS) algorithm.

5. The method according to claim 1, wherein the differentiating algorithm performs a differentiation between successive leaves of said pruned tree using a "U-shaped" scan trajectory.

6. The method according to claim 1, wherein the header portion of said each data element comprises a data signal incorporating a level of the tree where said data portion was derived.

7. The method according to claim 1, wherein the data portion of said each data element comprises a data signal representing an encoded motion vector.

8. The method according to claim 1, further including the step of encoding a differential data block losslessly using an adaptive arithmetic algorithm.

9. The method of claim 1, further including the step of encoding a differential data block losslessly using a Huffman algorithm.

10. A method for encoding motion video information for transmission of a video image comprising the steps of:

a) selecting a first image mask comprised of a predetermined number of picture elements;

b) applying said mask to an image to identify each one of a unique plurality of picture elements at a predetermined location in an image frame;

c) comparing each one of said plurality of picture elements with a like plurality of identified picture elements at said location in a previous frame;

d) selecting a second image mask which includes a smaller number of picture elements than the previous image mask if said picture elements in the comparison are not identical;

e) repeating steps b and c if said picture elements in the comparison are not identical; and f) if all picture elements of said comparison are identical, creating and storing a data signal indicating the location of the comparison and the size of the image mask.

11. The method according to claim 10, wherein the predetermined number of picture elements is 256 spatially arranged in a 16 by 16 block.

12. The method according to claim 10, wherein the predetermined number of picture elements is 64 spatially arranged in an 8 by 8 block.

13. The method according to claim 10, wherein each second image mask has a resolution that is half that of said previous image mask.

14. A method for encoding motion video displacement information between two successive frames of a video image comprising the steps of:

a) selecting a first image mask comprised of a predetermined number of pixels;

b) applying said mask to an image to identify each one of a unique plurality of pixels at a predetermined location in an image frame;

c) comparing each one of said plurality of pixels with a like plurality of pixels at one of a plurality of locations in a search field of a previous frame;

d) repeating step c at a next one of the plurality of locations in said search field if said pixels in the comparison are not generally identical;

e) if all pixels of said comparison are generally identical, creating and storing a data signal indicating the x-y displacement of the comparison and the size of the image mask; and f) if all pixels of said comparison are generally identical, but not exactly identical, reducing the number of pixels in the first image mask by half and repeating steps b through e.

15. The method of claim 14, wherein the predetermined number of pixels is 256 spatially arranged in a 16 by 16 block.

16. The method of claim 14, wherein the predetermined number of pixels is 64 spatially arranged in an 8 by 8 block.

* * * * *